United States Patent
Mustacchi et al.

(10) Patent No.: US 8,793,688 B1
(45) Date of Patent: Jul. 29, 2014

(54) SYSTEMS AND METHODS FOR DOUBLE HULLED VIRTUALIZATION OPERATIONS

(71) Applicants: Robert Mustacchi, San Francisco, CA (US); Max Bruning, Santa Cruz, CA (US); Gerald Jelinek, Colorado Springs, CO (US); Bryan Cantrill, Piedmont, CA (US)

(72) Inventors: Robert Mustacchi, San Francisco, CA (US); Max Bruning, Santa Cruz, CA (US); Gerald Jelinek, Colorado Springs, CO (US); Bryan Cantrill, Piedmont, CA (US)

(73) Assignee: Joyent, Inc., San Francisco, CA (US)

( * ) Notice: Subject to any disclaimer, the term of this patent is extended or adjusted under 35 U.S.C. 154(b) by 0 days.

(21) Appl. No.: 13/835,865

(22) Filed: Mar. 15, 2013

(51) Int. Cl.
*G06F 9/455* (2006.01)

(52) U.S. Cl.
USPC .......................................................... 718/1

(58) Field of Classification Search
USPC .......................................................... 718/1
See application file for complete search history.

(56) References Cited

U.S. PATENT DOCUMENTS

| | | | |
|---|---|---|---|
| 6,393,495 B1 | 5/2002 | Flory et al. |
| 6,553,391 B1 | 4/2003 | Goldring et al. |
| 6,901,594 B1 | 5/2005 | Cain et al. |
| 7,222,345 B2 | 5/2007 | Gray et al. |
| 7,265,754 B2 | 9/2007 | Brauss |
| 7,379,994 B2 | 5/2008 | Collazo |
| 7,437,730 B2 | 10/2008 | Goyal |
| 7,529,780 B1 | 5/2009 | Braginsky et al. |
| 7,581,219 B2 | 8/2009 | Neiger et al. |
| 7,603,671 B2* | 10/2009 | Liu .................................. 718/1 |
| 7,640,547 B2 | 12/2009 | Neiman et al. |
| 7,685,148 B2 | 3/2010 | Engquist et al. |
| 7,774,457 B1 | 8/2010 | Talwar et al. |
| 7,814,465 B2 | 10/2010 | Liu |
| 7,849,111 B2 | 12/2010 | Huffman et al. |
| 7,899,901 B1 | 3/2011 | Njemanze et al. |
| 7,904,540 B2 | 3/2011 | Hadad et al. |
| 7,917,599 B1 | 3/2011 | Gopalan et al. |
| 7,933,870 B1 | 4/2011 | Webster |
| 7,940,271 B2 | 5/2011 | Wright et al. |
| 8,006,079 B2 | 8/2011 | Goodson et al. |

(Continued)

FOREIGN PATENT DOCUMENTS

WO 2011/088224 7/2011

OTHER PUBLICATIONS

Bi et al. "Dynamic Provisioning Modeling for Virtualized Multi-tier Applications in Cloud Data Center". 2010 IEEE 3rd International Conference on Cloud Computing. pp. 370-377.

(Continued)

*Primary Examiner* — Emerson Puente
*Assistant Examiner* — Steven Do
(74) *Attorney, Agent, or Firm* — Carr & Ferrell LLP (57) ABSTRACT

A method for storing and processing data includes providing an operating system (OS) virtualization running on a processor and having a plurality of containers. Each container may prevent privilege escalation by a user to an administrator of a global zone running the OS virtualization. The method may also include providing a hardware virtual machine (HVM) for the user, the HVM encapsulated in one of the containers. A system for storing and processing data is provided that includes an operating system (OS) virtualization stored in a memory and running on a processor. The OS virtualization has a plurality of containers, and each container prevents privilege escalation by a user to an administrator of a global zone running the OS virtualization. The HVM may be encapsulated in one of the containers. A non-transitory computer readable storage medium having a program recorded thereon is provided.

18 Claims, 7 Drawing Sheets

(56) References Cited

U.S. PATENT DOCUMENTS

| | | |
|---|---|---|
| 8,010,498 B2 | 8/2011 | Gounares et al. |
| 8,141,090 B1 | 3/2012 | Graupner et al. |
| 8,181,182 B1 | 5/2012 | Martin |
| 8,301,746 B2 | 10/2012 | Head et al. |
| 8,336,051 B2 | 12/2012 | Gokulakannan |
| 8,370,936 B2 | 2/2013 | Zuk et al. |
| 8,417,673 B2 | 4/2013 | Stakutis et al. |
| 8,417,746 B1 | 4/2013 | Gillett, Jr. et al. |
| 8,429,282 B1 | 4/2013 | Ahuja et al. |
| 8,434,081 B2 | 4/2013 | Cervantes et al. |
| 8,464,251 B2 | 6/2013 | Sahita et al. |
| 8,631,131 B2 | 1/2014 | Kenneth et al. |
| 8,677,359 B1 | 3/2014 | Cavage et al. |
| 2002/0069356 A1 | 6/2002 | Kim |
| 2002/0082856 A1 | 6/2002 | Gray et al. |
| 2002/0156767 A1 | 10/2002 | Costa et al. |
| 2002/0198995 A1 | 12/2002 | Liu et al. |
| 2003/0154112 A1 | 8/2003 | Neiman et al. |
| 2003/0163596 A1 | 8/2003 | Halter et al. |
| 2004/0088293 A1 | 5/2004 | Daggett |
| 2005/0097514 A1 | 5/2005 | Nuss |
| 2005/0108712 A1 | 5/2005 | Goyal |
| 2005/0188075 A1 | 8/2005 | Dias et al. |
| 2006/0107087 A1 | 5/2006 | Sieroka et al. |
| 2006/0153174 A1 | 7/2006 | Towns-von Stauber et al. |
| 2006/0218285 A1 | 9/2006 | Talwar et al. |
| 2006/0246879 A1 | 11/2006 | Miller et al. |
| 2006/0248294 A1 | 11/2006 | Nedved et al. |
| 2006/0294579 A1 | 12/2006 | Khuti et al. |
| 2007/0088703 A1 | 4/2007 | Kasiolas et al. |
| 2007/0118653 A1 | 5/2007 | Bindal |
| 2007/0168336 A1 | 7/2007 | Ransil et al. |
| 2007/0179955 A1* | 8/2007 | Croft et al. ........................ 707/9 |
| 2007/0250838 A1 | 10/2007 | Belady et al. |
| 2007/0271570 A1 | 11/2007 | Brown et al. |
| 2008/0080396 A1 | 4/2008 | Meijer et al. |
| 2008/0103861 A1 | 5/2008 | Zhong |
| 2008/0155110 A1 | 6/2008 | Morris |
| 2009/0044188 A1 | 2/2009 | Kanai et al. |
| 2009/0077235 A1 | 3/2009 | Podila |
| 2009/0164990 A1 | 6/2009 | Ben-Yehuda et al. |
| 2009/0172051 A1 | 7/2009 | Huffman et al. |
| 2009/0193410 A1 | 7/2009 | Arthursson et al. |
| 2009/0216910 A1 | 8/2009 | Duchesneau |
| 2009/0259345 A1 | 10/2009 | Kato et al. |
| 2009/0260007 A1 | 10/2009 | Beaty et al. |
| 2009/0300210 A1 | 12/2009 | Ferris |
| 2010/0050172 A1 | 2/2010 | Ferris |
| 2010/0057913 A1 | 3/2010 | DeHaan |
| 2010/0106820 A1 | 4/2010 | Gulati et al. |
| 2010/0114825 A1 | 5/2010 | Siddegowda |
| 2010/0125845 A1 | 5/2010 | Sugumar et al. |
| 2010/0131324 A1 | 5/2010 | Ferris |
| 2010/0131854 A1 | 5/2010 | Little |
| 2010/0153958 A1 | 6/2010 | Richards et al. |
| 2010/0162259 A1 | 6/2010 | Koh et al. |
| 2010/0223383 A1 | 9/2010 | Salevan et al. |
| 2010/0223385 A1 | 9/2010 | Gulley et al. |
| 2010/0228936 A1 | 9/2010 | Wright et al. |
| 2010/0235632 A1 | 9/2010 | Iyengar et al. |
| 2010/0250744 A1 | 9/2010 | Hadad et al. |
| 2010/0262752 A1 | 10/2010 | Davis et al. |
| 2010/0268764 A1 | 10/2010 | Wee et al. |
| 2010/0299313 A1 | 11/2010 | Orsini et al. |
| 2010/0306765 A1 | 12/2010 | DeHaan |
| 2010/0306767 A1 | 12/2010 | DeHaan |
| 2010/0318609 A1 | 12/2010 | Lahiri et al. |
| 2010/0332629 A1 | 12/2010 | Cotugno et al. |
| 2010/0333087 A1 | 12/2010 | Vaidyanathan et al. |
| 2011/0004566 A1 | 1/2011 | Berkowitz et al. |
| 2011/0016214 A1 | 1/2011 | Jackson |
| 2011/0029969 A1 | 2/2011 | Venkataraja et al. |
| 2011/0029970 A1 | 2/2011 | Arasaratnam |
| 2011/0047315 A1 | 2/2011 | De Dinechin et al. |
| 2011/0055396 A1 | 3/2011 | DeHaan |
| 2011/0055398 A1 | 3/2011 | Dehaan et al. |
| 2011/0078303 A1 | 3/2011 | Li et al. |
| 2011/0107332 A1 | 5/2011 | Bash |
| 2011/0131306 A1 | 6/2011 | Ferris et al. |
| 2011/0131329 A1 | 6/2011 | Kaplinger et al. |
| 2011/0131589 A1 | 6/2011 | Beaty et al. |
| 2011/0138382 A1 | 6/2011 | Hauser et al. |
| 2011/0138441 A1 | 6/2011 | Neystadt et al. |
| 2011/0145392 A1 | 6/2011 | Dawson et al. |
| 2011/0153724 A1 | 6/2011 | Raja et al. |
| 2011/0161952 A1 | 6/2011 | Poddar et al. |
| 2011/0173470 A1 | 7/2011 | Tran |
| 2011/0179132 A1 | 7/2011 | Mayo et al. |
| 2011/0179134 A1 | 7/2011 | Mayo et al. |
| 2011/0179162 A1 | 7/2011 | Mayo et al. |
| 2011/0185063 A1 | 7/2011 | Head et al. |
| 2011/0219372 A1 | 9/2011 | Agrawal et al. |
| 2011/0270968 A1 | 11/2011 | Salsburg et al. |
| 2011/0276951 A1 | 11/2011 | Jain |
| 2011/0296021 A1 | 12/2011 | Dorai et al. |
| 2011/0302378 A1 | 12/2011 | Siebert |
| 2011/0302583 A1 | 12/2011 | Abadi et al. |
| 2011/0320520 A1 | 12/2011 | Jain |
| 2012/0017210 A1 | 1/2012 | Huggins et al. |
| 2012/0054742 A1 | 3/2012 | Eremenko et al. |
| 2012/0060172 A1 | 3/2012 | Abouzour |
| 2012/0066682 A1 | 3/2012 | Al-Aziz et al. |
| 2012/0079480 A1 | 3/2012 | Liu |
| 2012/0089980 A1* | 4/2012 | Sharp et al. ........................ 718/1 |
| 2012/0124211 A1 | 5/2012 | Kampas et al. |
| 2012/0131156 A1 | 5/2012 | Brandt et al. |
| 2012/0131591 A1 | 5/2012 | Moorthi et al. |
| 2012/0159507 A1 | 6/2012 | Kwon et al. |
| 2012/0167081 A1 | 6/2012 | Sedayao et al. |
| 2012/0173709 A1 | 7/2012 | Li et al. |
| 2012/0179874 A1 | 7/2012 | Chang et al. |
| 2012/0185913 A1 | 7/2012 | Martinez et al. |
| 2012/0198442 A1 | 8/2012 | Kashyap et al. |
| 2012/0204176 A1 | 8/2012 | Tian et al. |
| 2012/0221845 A1 | 8/2012 | Ferris |
| 2012/0246517 A1 | 9/2012 | Bender et al. |
| 2012/0266231 A1 | 10/2012 | Spiers et al. |
| 2012/0284714 A1* | 11/2012 | Venkitachalam et al. ........ 718/1 |
| 2012/0303773 A1 | 11/2012 | Rodrigues |
| 2012/0311012 A1 | 12/2012 | Mazhar et al. |
| 2013/0042115 A1 | 2/2013 | Sweet et al. |
| 2013/0060946 A1 | 3/2013 | Kenneth et al. |
| 2013/0067067 A1 | 3/2013 | Miri et al. |
| 2013/0081016 A1 | 3/2013 | Saito et al. |
| 2013/0086590 A1 | 4/2013 | Morris et al. |
| 2013/0129068 A1 | 5/2013 | Lawson et al. |
| 2013/0132057 A1 | 5/2013 | Deng et al. |
| 2013/0179881 A1 | 7/2013 | Calder et al. |
| 2013/0191835 A1 | 7/2013 | Araki |
| 2013/0191836 A1 | 7/2013 | Meyer |
| 2013/0318525 A1 | 11/2013 | Palanisamy et al. |
| 2013/0339966 A1 | 12/2013 | Meng et al. |
| 2013/0346974 A1 | 12/2013 | Hoffman et al. |

OTHER PUBLICATIONS

Chappell, David. "Introducing Windows Azure". Microsoft Corporation. Oct. 2010. pp. 1-25.

Yagoubi, Belabbas et al., "Load Balancing in Grid Computing," Asian Journal of Information Technology, vol. 5, No. 10, pp. 1095-1103, 2006.

Kramer, "Advanced Message Queuing Protocol (AMQP)," Linux Journal, Nov. 2009, p. 1-3.

Subramoni et al., "Design and Evaluation of Benchmarks for Financial Applications Using Advanced Message Queuing Protocol (AMQP) over InfiniBand," Nov. 2008.

Richardson et al., "Introduction to RabbitMQ," Sep. 2008, p. 1-33.

Bernstein et al., "Using XMPP as a Transport in Intercloud Protocols," Jun. 22, 2010, p. 1-8.

Bernstein et al., "Blueprint for the Intercloud—Protocols and Formats for Cloud Computing Interoperabiilty," May 28, 2009, pp. 328-336.

Gregg, Brendan, "Visualizing System Latency," May 1, 2010, ACM Queue, p. 1-13, http://queue.acm.org/detail.cfm?id=1809426.

(56) References Cited

OTHER PUBLICATIONS

Gregg, Brendan, "Heat Map Analytics," Mar. 17, 2009, Oracle, p. 1-7, https://blogs.oracle.com/brendan/entry/heat_map_analytics.

Mundigl, Robert, "There is More Than One Way to Heat a Map," Feb. 10, 2009, Clearly and Simply, p. 1-12, http://www.clearlyandsimply.com/clearly_and_simply/2009/02/there-is-more-than-one-way-to-heat-a-map.html.

International Search Report and Written Opinion of the International Searching Authority mailed May 5, 2011 in Patent Cooperation Treaty Application No. PCT/US2011/028230, filed Mar. 12, 2011.

Chef Documents. Retrieved Mar. 11, 2014 from http://docs.opscode.com/.

Ansible Documentation. Retrieved Mar. 11, 2014 from http://docs.ansible.com/.

Block 10 Controller. Retrieved Mar. 12, 2014 from https://www.kernel.org/doc/Documentation/cgroups/blkio-controller.txt.

Block Device Bio Throttling Support. Retrieved Mar. 12, 2014 from https://lwn.net/Articles/403889/.

Gregg, Brendan. Systems Performance: Enterprise and the Cloud, Prentice Hall, 2014, pp. 557-558.

Mesnier, Michael. I/O throttling. 2006. Retrieved Apr. 13, 2014 from https://www.usenix.org/legacy/event/fast07/tech/full_papers/mesnier/mesnier_html/node5.html.

* cited by examiner

SYSTEMS AND METHODS FOR DOUBLE HULLED VIRTUALIZATION OPERATIONS

FIELD OF THE INVENTION

The present invention relates to systems and methods for virtualization infrastructure of a cloud computing environment. More particularly, the present invention relates to a system and method for double hulled virtualization operations.

BACKGROUND

Cloud infrastructure, including storage and processing, is an increasingly important resource for businesses and individuals. Using a cloud infrastructure enables businesses to outsource all or substantially all of their information technology (IT) functions to a cloud service provider. Businesses using a cloud service provider benefit from increased expertise supporting their IT function, higher capability hardware and software at lower cost, and ease of expansion (or contraction) of IT capabilities.

Monitoring a cloud infrastructure is an important function of cloud service providers, and continuity of function is an important selling point for cloud service providers. Downtime due to malware or other failures should be avoided to ensure customer satisfaction. Cloud infrastructure monitoring conventionally includes network packet sniffing, but this is impractical as a cloud infrastructure scales up. Alternatively, host-based systems conventionally collect and aggregate information regarding processes occurring within the host.

SUMMARY OF THE INVENTION

According to exemplary embodiments, the present technology provides a method for storing and processing data. The method may include providing an operating system (OS) virtualization running on a processor and having a plurality of containers. Each container may prevent privilege escalation by a user to an administrator of a global zone running the OS virtualization. The method may also include providing a hardware virtual machine (HVM) for the user, the HVM encapsulated in one of the containers.

The method may include eliminating code paths directed from within each container to outside each container. The method may also include limiting access by the user associated with the HVM to the one container encapsulating the HVM. The method may further include limiting operations of the user within the container to instantiating another HVM.

The method may include configuring the HVM by a quick emulator (QEMU) to limit access by the user via a virtual network interface card (VNIC) to the container encapsulating the HVM. The method may also include preventing the user from changing the VNIC, and limiting actions of the user within the HVM by limiting privileges of the user at instantiation of the HVM by the QEMU.

Resource control of the OS virtualization may be inherited by the HVM. The HVM accesses a storage volume for the user via a virtual network interface card (VNIC) or via a virtual disk controller (VDC). Input/output is dynamically throttled for the HVM by the OS virtualization. Processor scheduling is performed for the HVM by the OS virtualization.

The method may include providing a debug module in the global zone hosting the OS virtualization. The debug module may be adapted to monitor input/output of the container. The debug module may be adapted to observe virtual register states of the HVM.

The method may include throttling input/output of the HVM by an administrator of the global zone.

A system for storing and processing data is provided that includes an operating system (OS) virtualization stored in a memory and running on a processor. The OS virtualization has a plurality of containers, and each container prevents privilege escalation by a user to an administrator of a global zone running the OS virtualization. The system also includes a hardware virtual machine (HVM) for the user. The HVM may be encapsulated in one of the containers.

A non-transitory computer readable storage medium having a program recorded thereon is provided. The program when executed causes a computer to perform a method for storing and processing data These and other advantages of the present technology will be apparent when reference is made to the accompanying drawings and the following description.

DETAILED DESCRIPTION OF EXEMPLARY EMBODIMENTS

While this technology is susceptible of embodiment in many different forms, there is shown in the drawings and will herein be described in detail several specific embodiments with the understanding that the present disclosure is to be considered as an exemplification of the principles of the technology and is not intended to limit the technology to the embodiments illustrated.

A hardware virtual machine (HVM), also generally referred to as a virtual machine or a hypervisor) is used to emulate a computer for a guest within a host computer system. Virtualization of many features of a mother-board is possible. Hardware virtualizations may emulate many motherboard properties by simulating a chip, including timers, interrupt controllers, disk controllers, and network controllers.

Virtual machines are useful for cloud providers to enable customers to operate a guest computer within a cloud processing environment. Various types of specific virtual machines exist, including KVM, Xen and Zones. Containers (also referred to as Zones and jails) are a feature of some virtual machines, for example, an operating system (OS) virtualization. Some virtual machines have better operating features than other virtual machines. Containers provide good security and resource control (for example, input/output (I/O), network connectivity, and central processing unit (CPU) scheduling). The present technology integrates two virtual machines to access the best features of both, while simultaneously producing a secure and observable virtual machine.

An exemplary method for storing and processing data is provided that includes providing a network connectivity component of a zone-based virtualization system. The exemplary method also includes providing a processing component of a virtual machine. The processing component of the virtual machine accesses the network connectivity component of the zone-based virtualization system for input/output operations.

In an exemplary embodiment, KVM is inserted into a Zone. The I/O path for Zones (which may be based on ZFS (Zettabyte File System) volumes) may be preferred over the I/O features of KVM, and therefore, I/O for Zones is used in the exemplary embodiment. KVM may fully emulate a motherboard, and may therefore have the advantage of providing a guest with an environment that does not require modification of guest software. By combining the two virtual machines in this manner, the best of both may be obtained to provide improved scalability and observability, without undue negative consequences. This is an unexpected result, since doubling virtualizations intuitively suggests a slower and more cumbersome operating system. Some hypervisors, such as KVM, handle I/O and memory by representing a physical machine within the virtual machine, which may be inefficient. By taking away the elements of the KVM virtualization that are less efficient, and instead using an OS virtualization for these elements, a preferred implementation is possible.

The nesting or encapsulating of one virtual machine (e.g., KVM) within another (e.g., Zones), while stripping away any redundancy, may optimize the result. In this manner, each virtualization level does not need to create an abstraction of the bare metal level, but may instead rely on abstractions made by a lower, or earlier-instantiated, level. The exemplary method of nesting virtual machines may include identifying ideal elements for each level, and inheriting the remaining abstractions from a level below. Therefore, using the exemplary method, nesting or layering more than two virtual machines for triple (or more) hulled security may be possible.

Resource controls for a virtual machine include: CPU, disk, and network. The disk I/O throttling may be dynamically controlled by a Zone, and other controls in the KVM environment may be inherited from the OS virtualization and/or the motherboard. A Zone limits device controls, and presents itself as a complete operating system, without a kernel. Containers are not a process themselves, but a way for the kernel to group processes. Unexpected results from the integration of KVM and OS virtualization include conventional CPU scheduling and other resource controls being inherited by KVM from the OS virtualization.

Some exemplary changes enabling KVM to run inside Zones include modification of the QEMU (Quick Emulator) that emulates a CPU during instantiation of the KVM instance. In particular, the interface between QEMU and the virtual network interface card (VNIC) prevents the KVM guest from media access control (MAC) and Internet Protocol (IP) address spoofing and/or modifying a networking stack. Each VNIC is assigned to a Zone, and operates like a physical hardware switching port. The QEMU process is run to set-up a virtual machine. The VNIC is modified according to an exemplary embodiment to prevent a guest from changing the properties of the VNIC. If modification is attempted, network packets may be dropped. In this manner, the exemplary embodiment shows only the packets to and/or from the Zone having the correct MAC and IP address, thereby preventing packet paths from mixing. ZFS is a file management system, which is accessed by QEMU to address file storage issues in exemplary embodiments.

The process flow for instantiation of a KVM guest inside a Zone according to an exemplary embodiment of the present technology includes the global zone (also referred to as the kernel) setting-up a Zone. Zones can launch processes including a virtual machine. After a container is set-up, a QEMU process is started to provide an HVM guest. Every action in the OS virtualization requires a privilege. At launch of QEMU, privileges are stripped away, and the exemplary KVM brand provides these properties to control a master spawning process. Even if a breakout (due to, for example, a UNIX vulnerability) from KVM to QEMU is accomplished, the QEMU cannot execute any processes, since every action in the Zone requires a privilege. A QEMU guest does not have access to any new devices and cannot create additional KVM guests even if there is a breakout.

Significantly, no privilege escalation from the Zone to the global zone is possible, since no code path exists for promoting a user within a Zone to be an administrator of the global zone. The container can set up the processes of QEMU, and only a few code paths exist crossing the container boundary. Further, all of the code paths are one-directional into the container. The kernel is designed to only allow changes from the global zone into a zone, while preventing any action within a Zone from impacting the global zone.

Debugging modules, for example DTrace, may be software for identifying network and processor activity. DTrace can monitor operations inside a Zone, and can determine state data for a virtual register of a virtual machine. Using DTrace or another appropriate debugging module, an administrator can profile a guest while the HVM is running, without the guest knowing. DTrace can dynamically observe traffic over a VNIC.

Figure 1A:
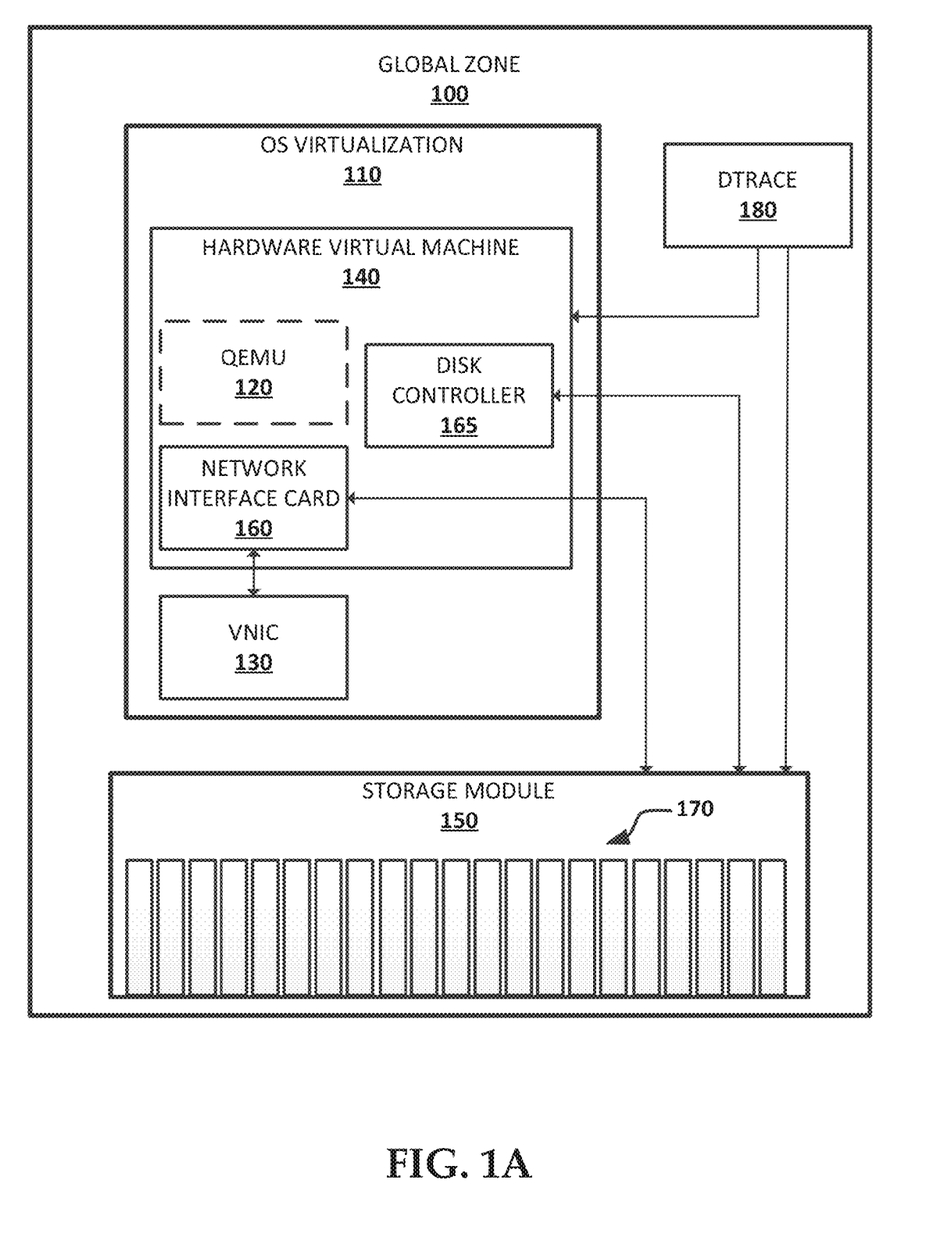
FIGS. 1A and 1B are diagrams illustrating an exemplary embodiment of a global zone.

FIG. 1A illustrates an exemplary embodiment of global zone 100. Global zone 100 is managed by an administrator. Within global zone 100 is storage module 150 including disks 170. Alternatively, disks 170 may be any other appropriate form of persistent memory. Storage module 150 may be operated based on ZFS volumes. The administrator may create OS virtualization 110 for use by a customer, and OS virtualization 110 may be provided with virtual network interface card (VNIC) 130 for communicating outside OS virtualization 110. QEMU 120 may be started for the purpose of creating hardware virtual machine 140 for the customer within OS virtualization 110. QEMU 120 may strip away privileges of hardware virtual machine 140 during instantiation, and may have no other functions other than creating hardware virtual machine 140. Hardware virtual machine 140 may include network interface card 160 for communicating input/output data to storage module 150 or any other network. Hardware virtual machine 140 may include an emulated disk controller 165 for communicating input/output data to storage module 150. VNIC 130 is the gateway for all network traffic from the emulated network interface card 160. DTrace 180, or any other appropriate visualization and/or debug module, may be used by an administrator in global zone 100 to monitor hardware virtual machine 140. DTrace 180 may be used to monitor network traffic, virtual registers, and/or other processes operating on behalf of hardware virtual machine 140. DTrace 180 may operate without the knowledge of the customer or a user operating hardware virtual machine 140.

Figure 1B:
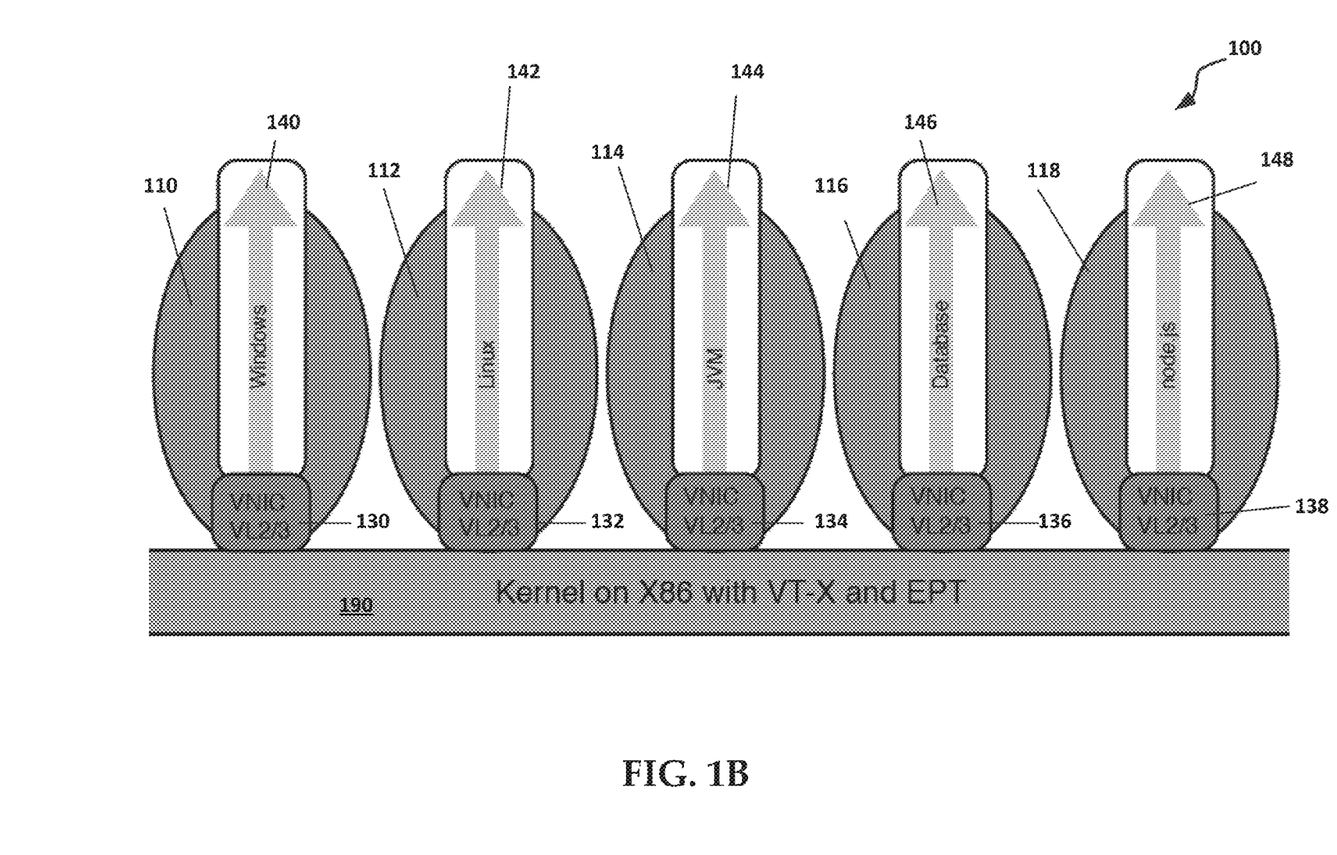

FIG. 1B illustrates an exemplary embodiment of global zone 100. Global zone 100 may run on kernel 190, which may be run by an administrator. The administrator may create OS virtualizations 110, 112, 114, 116 and 118 (or more), for use by one or more customers. OS virtualizations 110, 112, 114, 116 and 118 may be provided with virtual network interface cards (VNICs) 130, 132, 134, 136 and 138, respectively, for controlling communications with kernel 190. OS virtualizations 110, 112, 114, 116 and 118 encapsulate hardware virtual machines (HVMs) 140, 142, 144, 146 and 148, respectively. Each of hardware virtual machines 140, 142, 144, 146 and 148 is a different, exemplary type of virtual machine, which may be selected by a customer from a library of possible virtual machines prior to instantiation. Hardware virtual machines 140 is a Windows machine, hardware virtual machine 142 is a Linux machine, hardware virtual machine 144 runs a Java virtual machine (JVM) application, hardware virtual machine 146 runs a Database application, and hardware virtual machine 148 runs a node.js application. The encapsulation of hardware virtual machines 140, 142, 144, 146 and 148 by OS virtualizations 110, 112, 114, 116 and 118 creates a double hulled security that prevents mischievous conduct by a customer or guest within a cloud system. Escape or breakout from any of hardware virtual machines 140, 142, 144, 146 and 148 only provides access to OS virtualizations 110, 112, 114, 116 and 118, respectively. Further, OS virtualizations 110, 112, 114, 116 and 118 all provide a secure area that prevents privilege escalation by a user to be an administrator and/or to access global zone 100 or kernel 190.

Figure 2:
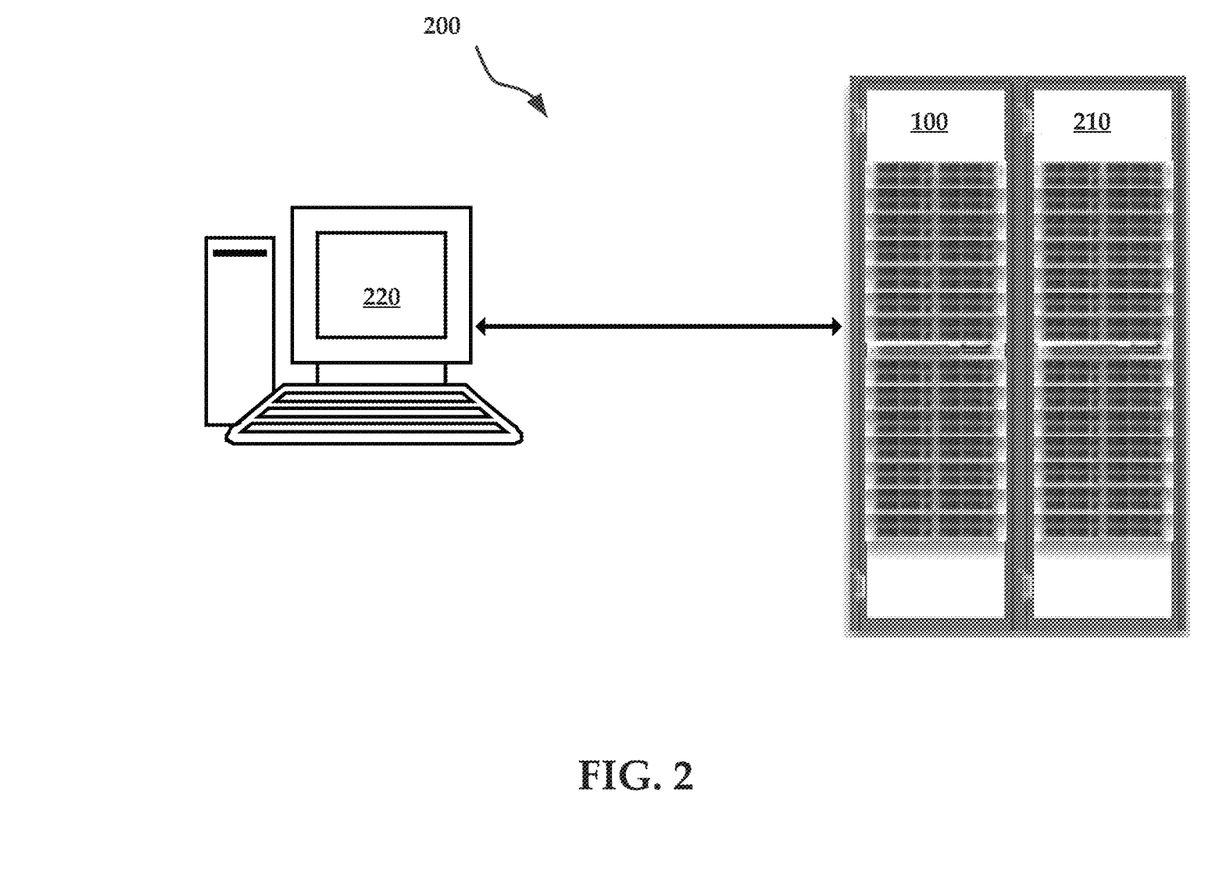
FIG. 2 is a system level diagram illustrating an exemplary embodiment of a compute/storage server and datacenter administrator.

FIG. 2 is a system level diagram illustrating datacenter 200 including compute/storage servers 100 and 210, and administrator terminal 220. Administrator terminal 220 may be used to control all or a portion of datacenter 200, and/or may be used to operate multiple datacenters. Administrator terminal 220 may communicatively couple with hardware virtual machine 140 of compute/storage server 100, and/or may monitor the operations of OS virtualization 110 and/or storage module 150. In this manner, the present technology enables a datacenter administrator to observe operations of compute and storage to a degree that was previously impossible. In particular, the internal processes of hardware virtual machines 140, 142, 144, 146 and 148 may be identified and visualized, and may be correlated with input/output operations of storage module 150.

Figure 3:
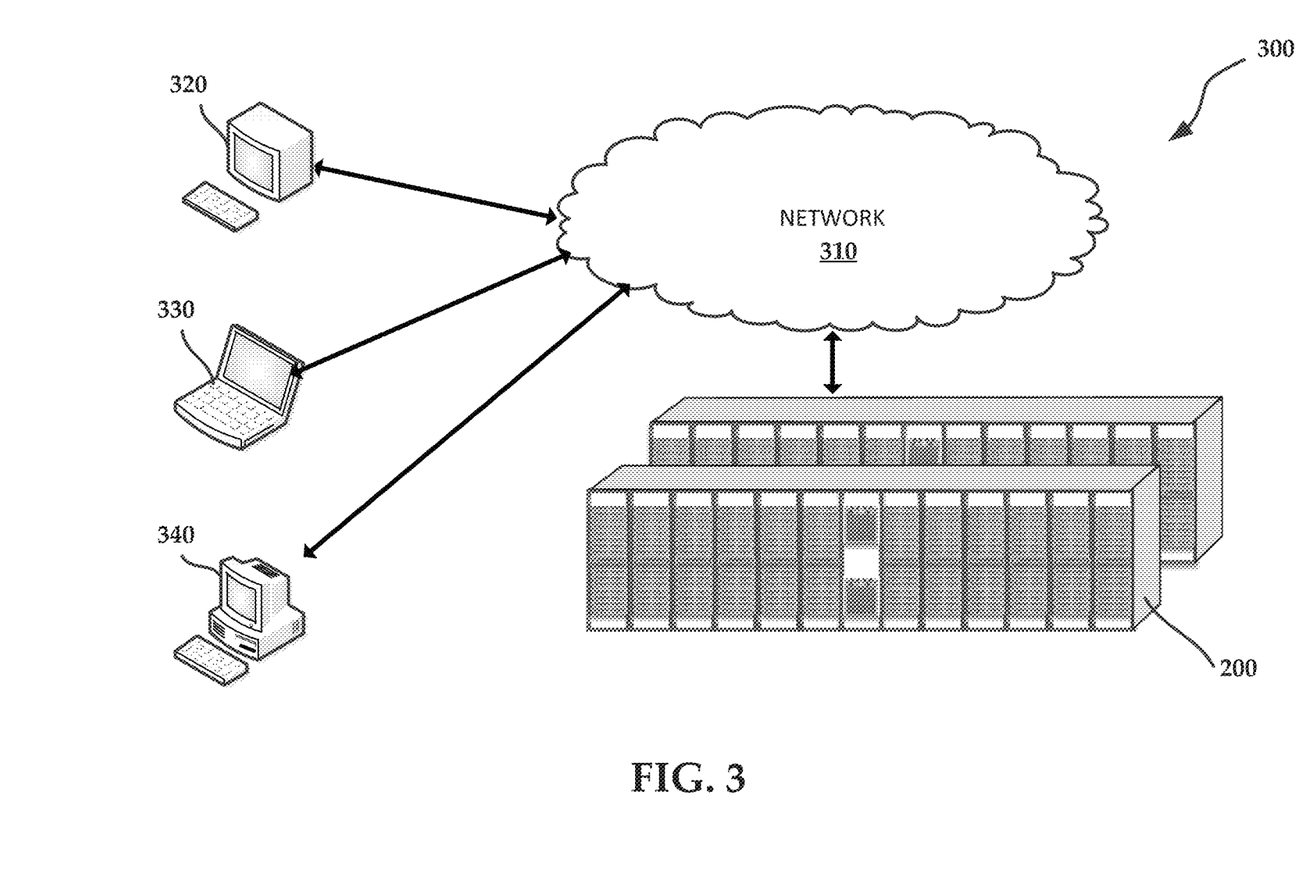
FIG. 3 is a diagram illustrating an exemplary embodiment of a cloud-based data storage and processing system.

FIG. 3 illustrates cloud-based data storage and processing system 300. Cloud-based data storage and processing system 300 includes datacenter 200 communicatively coupled to network 310. Network 310 may be a wide-area network (WAN), a local area network (LAN), the internet, or any other appropriate network. Customers may access cloud-based data storage and processing system 300 by using any of customer terminal 320, customer laptop 330, and/or customer personal computer 340 (or the like) to access network 310.

Figure 4:
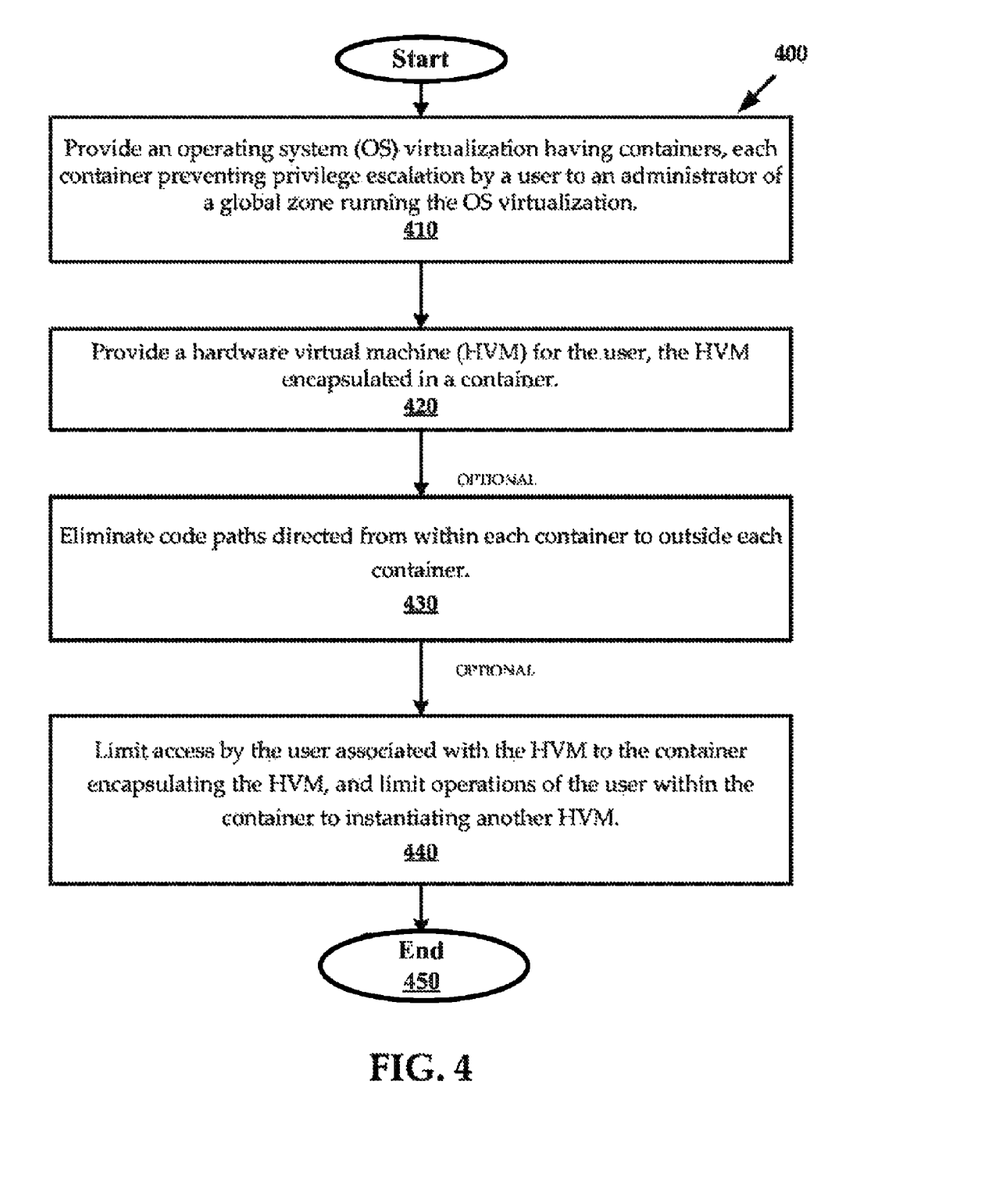
FIG. 4 is a flow chart illustrating an exemplary method.

FIG. 4 illustrates method 400 according to the present technology. Method 400 proceeds from a start oval to operation 410, which indicates to provide an operating system (OS) virtualization having containers. In operation 410, each container prevents privilege escalation by a user to an administrator of a global zone running the OS virtualization. From operation 410, the flow proceeds to operation 420, which indicates to provide a hardware virtual machine (HVM) for the user, the HVM encapsulated in a container. From operation 420, the flow optionally proceeds to operation 430, which indicates to eliminate code paths directed from within each container to outside each container. From operation 430, the flow optionally proceeds to operation 440, which indicates to limit access by the user associated with the HVM to the container encapsulating the HVM, and limit operations of the user within the container to instantiating another HVM. From operation 440, the flow proceeds to end oval 450.

Figure 5:
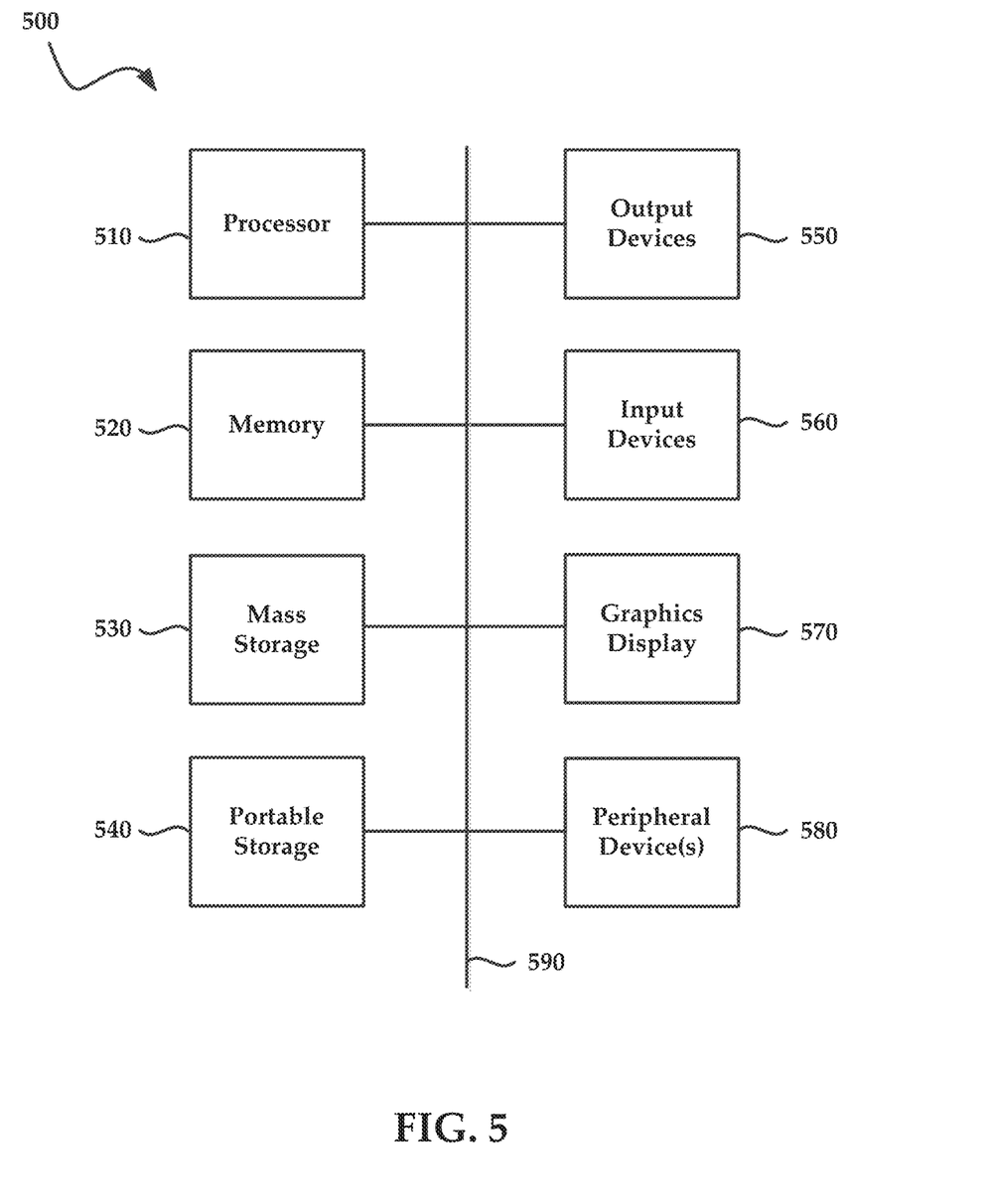
FIG. 5 is a schematic of a computer system according to an exemplary embodiment.

FIG. 5 illustrates an exemplary computing system 500 that may be used to implement an embodiment of the present technology. For example, global zone 100, kernel 190, administrator terminal 220, network 310, customer terminal 320, customer laptop 330 and/or customer personal computer 340 may be implemented by one or more of the components of computing system 500. Additionally or alternatively, computing system 500 may be used to implement method 400 of FIG. 4. The computing system 500 of FIG. 5 includes one or more processors 510 and memory 520. Memory 520 stores, in part, instructions and data for execution by the one or more processors 510. Memory 520 can store the executable code when the computing system 500 is in operation. The computing system 500 of FIG. 5 may further include a mass storage 530, portable storage 540, output devices 550, input devices 560, a graphics display 570, and other peripheral device(s) 580.

The components shown in FIG. 5 are depicted as being connected via a single bus 590. The components may be connected through one or more data transport means. The one or more processor 510 and memory 520 may be connected via a local microprocessor bus, and the mass storage 530, peripheral device(s) 580, portable storage 540, and graphics display 570 may be connected via one or more input/output (I/O) buses.

Mass storage 530, which may be implemented with a magnetic disk drive or an optical disk drive, is a non-volatile storage device for storing data and instructions for use by processor 510. Mass storage 530 can store the system software for implementing embodiments of the present technology for purposes of loading that software into memory 520.

Portable storage 540 operate in conjunction with a portable non-volatile storage medium, such as a floppy disk, compact disk or digital video disc, to input and output data and code to and from the computing system 500 of FIG. 5. The system software for implementing embodiments of the present technology may be stored on such a portable medium and input to the computing system 500 via the portable storage 540.

Input devices 560 provide a portion of a user interface. Input devices 560 may include an alphanumeric keypad, such as a keyboard, for inputting alphanumeric and other information, or a pointing device, such as a mouse, a trackball, stylus, or cursor direction keys. Additionally, the computing system 500 as shown in FIG. 5 includes output devices 550. Suitable output devices include speakers, printers, network interfaces, and monitors.

Graphics display 570 may include a liquid crystal display (LCD) or other suitable display device. Graphics display 570 receives textual and graphical information, and processes the information for output to the display device.

Peripheral device(s) 580 may include any type of computer support device to add additional functionality to the computing system. Peripheral device(s) 580 may include a modem or a router.

The components contained in the computing system 500 of FIG. 5 are those typically found in computing systems that may be suitable for use with embodiments of the present technology and are intended to represent a broad category of such computer components that are well known in the art. Thus, the computing system 500 of FIG. 5 can be a personal computer, hand held computing system, telephone, mobile computing system, workstation, server, minicomputer, mainframe computer, or any other computing system. The computer can also include different bus configurations, networked platforms, multi-processor platforms, etc. Various operating systems can be used including SmartOS, UNIX, Linux, Windows, Macintosh OS, Palm OS, and other suitable operating systems.

Figure 6:
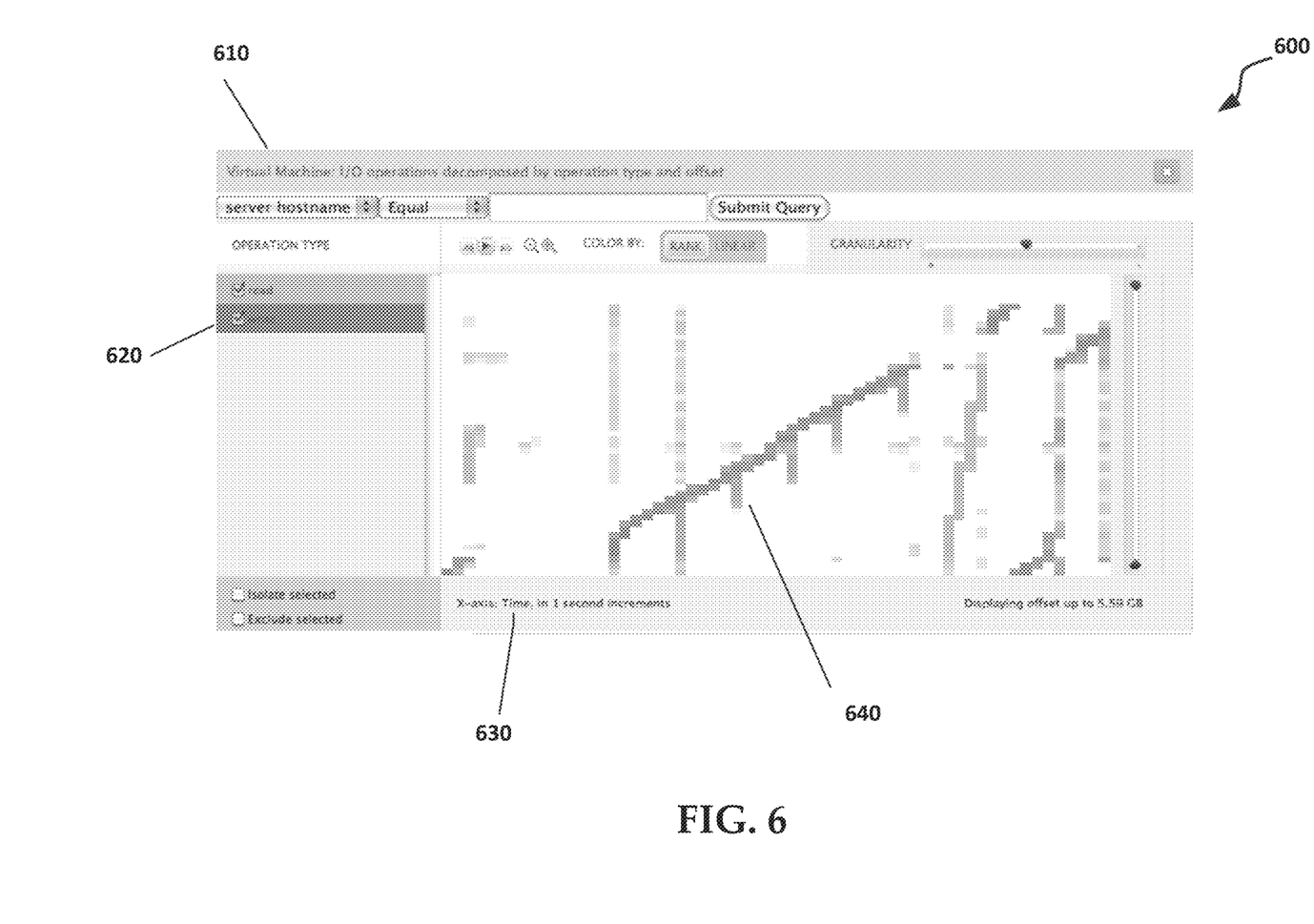
FIG. 6 is a graphical user interface of an exemplary embodiment of a guest monitoring program.

FIG. 6 is graphical user interface 600 of an exemplary embodiment of a guest monitoring program. The guest monitoring program may be DTrace, a debugging module, or any other appropriate monitoring software. Graphical user interface 600 may indicate target information 610, for instance a virtual machine (by name and/or type) and/or a process (for example, I/O operations or register states). Filtering toggles 620 may enable an administrator using the guest monitoring program to filter the data, for example to include or exclude either "read" or "write" in an analytic view of I/O operations. Data context 630, for example an x-axis identifier and/or a scale indication, may be provided to give additional context to the data displayed. Display area 640 may be used to visualize data and may include different colors, intensities, shapes and positions to indicate different data elements.

The above description is illustrative and not restrictive. Many variations of the technology will become apparent to those of skill in the art upon review of this disclosure. The scope of the technology should, therefore, be determined not with reference to the above description, but instead should be determined with reference to the appended claims along with their full scope of equivalents.

What is claimed is:

1. A method for storing and processing data, comprising:
providing an operating system (OS) virtualization running on a processor and having a plurality of containers, one or more containers preventing privilege escalation by a user to an administrator of a global zone running the OS virtualization;
providing a hardware virtual machine (HVM) for the user, the HVM encapsulated in one of the one or more containers;
limiting access by the user associated with the HVM to the one of the one or more containers encapsulating the HVM; and
limiting operations of the user within the one of the one or more containers to instantiating another HVM.

2. The method of claim 1, further comprising eliminating code paths directed from within the one of the one or more containers to outside the one of the one or more containers.

3. The method of claim 1 further comprising configuring the HVM by a quick emulator (QEMU) to limit access by the user via a virtual network interface card (VNIC) to the one of the one or more containers encapsulating the HVM.

4. The method of claim 3, further comprising:
preventing the user from changing the VNIC; and
limiting actions of the user within the HVM by limiting privileges of the user at an instantiation of the HVM by the QEMU.

5. The method of claim 1, wherein limited resource control of the OS virtualization is inherited by the HVM.

6. The method of claim 5, wherein:
the HVM accesses at least one storage volume for the user via at least one of a virtual network interface card (VNIC) and a virtual disk controller (VDC);
input/output is dynamically throttled for the HVM by the OS virtualization; and
processor scheduling is performed for the HVM by the OS virtualization.

7. The method of claim 1, further comprising providing a debug module in the global zone hosting the OS virtualization, the debug module adapted to monitor input/output of the one of the one or more containers.

8. The method of claim 7, wherein the debug module is adapted to observe virtual register states of the HVM.

9. The method of claim 1, further comprising throttling input/output of the HVM by an administrator of the global zone.

10. A system for storing and processing data, comprising:
an operating system (OS) virtualization stored in a memory and running on a processor, the OS virtualization having a plurality of containers, one or more containers preventing privilege escalation by a user to an administrator of a global zone running the OS virtualization;
a hardware virtual machine (HVM) for the user, the HVM encapsulated in one of the one or more containers;
wherein:
access by the user associated with the HVM is limited to the one of the one or more containers encapsulating the HVM; and
operations of the user within the one of the one or more containers are limited to instantiating another HVM.

11. The system of claim 10, wherein code paths directed from within the one of the one or more containers to outside the one of the one or more containers are eliminated.

12. The system of claim 10, further comprising configuring the HVM by a quick emulator (QEMU) to limit access by the user via at least one of a virtual network interface card (VNIC) and a virtual disk controller (VDC) to the one of the one or more containers encapsulating the HVM.

13. The system of claim 12, wherein:
the user is prevented from changing the VNIC; and
actions of the user within the HVM are limited by limiting privileges of the user at an instantiation of the HVM by the QEMU.

14. The system of claim 10, wherein:
limited resource control of the OS virtualization is inherited by the HVM;
the HVM accesses at least one storage volume for the user via at least one of a virtual network interface card (VNIC) and a virtual disk controller;
input/output is dynamically throttled for the HVM by the OS virtualization; and
processor scheduling is performed for the HVM by the OS virtualization.

15. The system of claim 10, further comprising a debug module in the global zone hosting the OS virtualization, the debug module adapted to monitor input/output of the one of the one or more containers, the debug module further adapted to observe register states of the HVM.

16. The system of claim 10, wherein input/output of the HVM is throttled by an administrator of the global zone.

17. A non-transitory computer readable storage medium having a program recorded thereon, the program when executed causing a computer to perform a method for storing and processing data, the method comprising:
providing an operating system (OS) virtualization having a plurality of containers, one or more containers preventing privilege escalation by a user to an administrator of a global zone running the OS virtualization;
providing a hardware virtual machine (HVM) for the user, the HVM encapsulated in one of the one or more containers;
eliminating code paths directed from within the one of the one or more containers to outside the one of the one or more containers;
limiting access by the user associated with the HVM to the one of the one or more containers encapsulating the HVM; and limiting operations of the user within the one of the one or more containers to instantiating another HVM.

18. The non-transitory computer readable storage medium of claim 17, wherein the method further comprises:
configuring the HVM by a quick emulator (QEMU) to limit access by the user via at least one of a virtual network interface card (VNIC) and a virtual disk controller (VDC) to the one of the one or more containers encapsulating the HVM;
preventing the user from changing the VNIC; and
limiting actions of the user within the HVM by limiting privileges of the user at instantiation of the HVM by the QEMU.

* * * * *